No. 625,386. Patented May 23, 1899.
C. M. DURNELL.
HAND CULTIVATOR.
(Application filed Aug. 19, 1898.)
(No Model.) 2 Sheets—Sheet 1.

Witnesses:
M. R. Remley.
S. Kernahan.

Inventor:
Cecil M. Durnell

By Higdon, Fischer & Thorpe
Attys.

No. 625,386. Patented May 23, 1899.
C. M. DURNELL.
HAND CULTIVATOR.
(Application filed Aug. 19, 1898.)
(No Model.) 2 Sheets—Sheet 2.
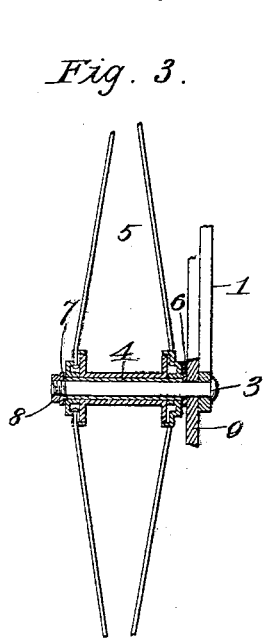
Fig. 3.
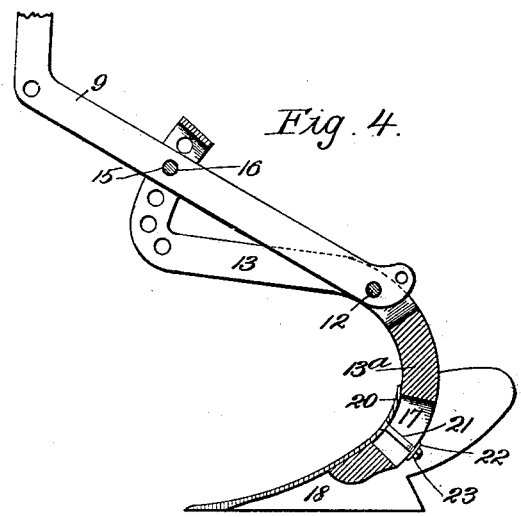
Fig. 4.
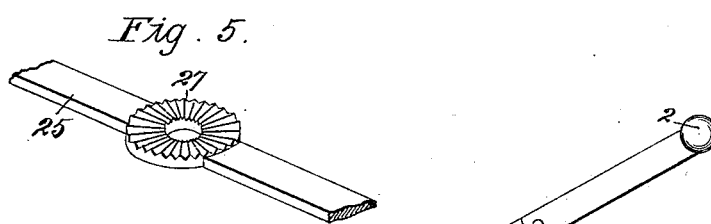
Fig. 5.
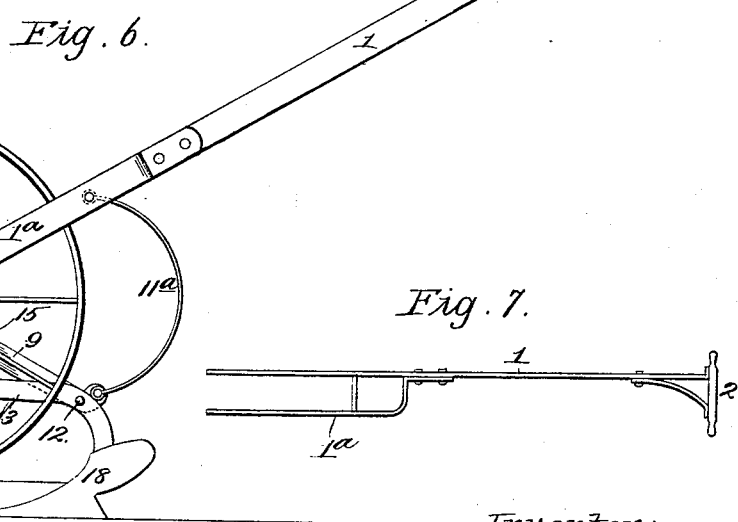
Fig. 6.
Fig. 7.
Witnesses
M. R. Remley.
S. Kernahan.
Inventor:
Cecil M. Durnell
By Higdon, Fischer & Thorpe
attys.

UNITED STATES PATENT OFFICE.

CECIL M. DURNELL, OF INDEPENDENCE, MISSOURI, ASSIGNOR, BY DIRECT AND MESNE ASSIGNMENTS, TO PRESTON J. ROBERTS, JR., FRANK ROBERTS, AND WILLIAM C. ROBERTS, OF SAME PLACE.

HAND-CULTIVATOR.

SPECIFICATION forming part of Letters Patent No. 625,386, dated May 23, 1899.

Application filed August 19, 1898. Serial No. 688,953. (No model.)

*To all whom it may concern:*

Be it known that I, CECIL M. DURNELL, of Independence, Jackson county, Missouri, have invented certain new and useful Improvements in Hand-Cultivators, of which the following is a specification.

My invention relates to cultivators, and more especially to that type which are manually propelled.

One object of my invention is to produce a machine of this character whereby the depth of cultivation may be regulated at will and which can be adjusted to accommodate rows of different widths.

A further object is to produce a cultivator which is of simple, strong, durable, compact, and inexpensive construction.

Other objects of the invention will hereinafter appear, and its novel features and combinations thereof will be pointed out in the appended claims.

Figure 1:
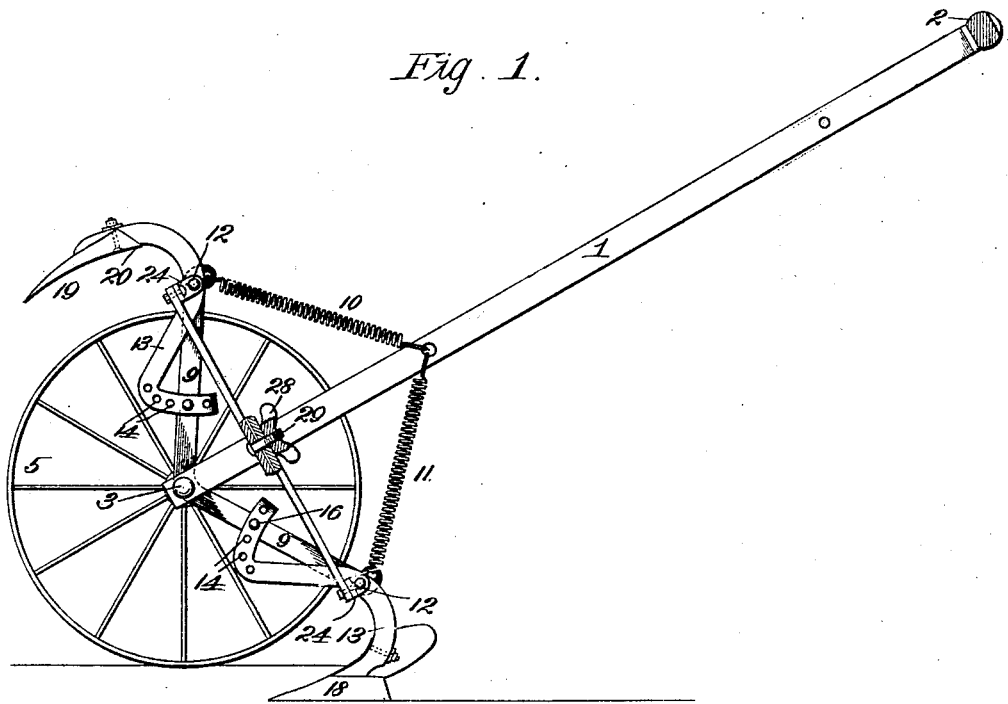
Figure 2:
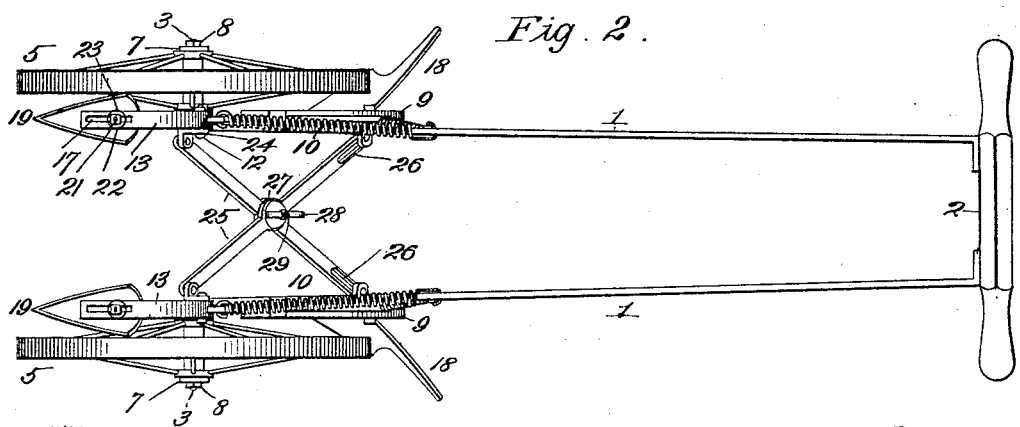

Referring to the drawings, which illustrate the invention, Figure 1 is a vertical central section. Fig. 2 is a top plan view. Fig. 3 is a central section of one of the carrying-wheels. Fig. 4 is a sectional view of one of the cultivating-plows enlarged. Fig. 5 is a detail perspective view of one of the cross-bars connecting the plow-shanks and the brackets carrying the same. Fig. 6 is a side view of a modified form. Fig. 7 is a plan view of the frame of the same.

In the said drawings, 1 designates a pair of substantially parallel bars connected at their rear ends by a handle 2 and provided at their front ends with outwardly-projecting bolts 3. 4 designates spindles upon said bolts, and 5 carrying-wheels journaled upon said spindles and prevented from endwise movement by means of the washers 6 and 7 upon bolts 3, nuts 8, screwed upon the outer ends of said bolts, holding washers 7 in position.

Washers 6 are held reliably in place by means of the angle-brackets 9, mounted upon bolts 3 and interposed between said washers and the handle-bars 1. The arms of said angle-brackets diverge rearward and extend at equal angles to the bars 1 and are connected at their upper and lower ends to said bars 1 by means of the retractile springs 10 and 11, the object of which will hereinafter appear. Adjacent to their ends they carry bolts 12, and mounted upon said bolts and embracing the ends of said brackets are slotted and approximately Z-shaped plow or cultivator shanks 13, the inner ends of said shanks being provided with holes or openings 14, extending in concentric series to the bolts 12 and adapted to register with the holes or openings 15 in brackets 9 in order that the pins or bolts 16 may be engaged with said registering openings, and thereby secure the said shanks in the desired positions with relation to said brackets, this adjustment being one of the factors whereby the depth of cultivation may be varied. The outer ends of the Z-shaped shanks are curved, as shown at 13ª, and longitudinally slotted, as shown at 17, in order that the plow 18 or shovel 19, having a correspondingly-curved portion 20, may be adjusted higher or lower upon the shank, and therefore be a material factor in regulating the depth of cut.

A bolt 21, extending from each plow or shovel through the slots 17 and engaged by the washer 22 and clamping-nut 23, secures the cultivating instrument at the point to which it is adjusted.

In order to brace the handle-bars 1 apart and at the same time provide for variations in distance between the cultivating instrumentalities, I provide the following construction—that is to say: 24 designates angle-brackets mounted upon pivot-bolts 12, and 25 intersecting cross-bars which are pivoted to said brackets, the connection at one end of each bar being of the pin-and-slot type, as shown at 26, in order that the handle-bars may be sprung toward each other or apart in the adjustment of the machine to accommodate rows of different widths. In order to prevent any possible chance of collapse due to slippage of said parts at their points of inintersection, they are provided with a circular series of teeth 27, meshing together, and a clamping-nut of the wing-nut variety engages the pivot-bolt 29, extending through said intersecting parts, as shown clearly.

While the plow or cultivator shanks have been described as though both sides were longitudinally slotted, it is to be understood that I prefer to employ what is known as the "diamond" shovel-plow on a pair of said shanks. In this case it is obvious that it will be unnecessary to slot the shanks by which said plows are carried.

In Fig. 6 I illustrate a modified form of plow, this modification residing principally in the fact that a leaf or flat spring 11ª is employed in lieu of the retractile spring 11. In other respects the machine is of the same type, except that it is a one-shovel instead of a two-shovel machine—that is to say, it embraces only the parts necessary to form one side of the machine, as disclosed in Fig. 2, the expansive frame 25 being of course dispensed with also. As it is necessary to provide a firm and reliable bearing for the single carrying-wheel employed, the handle-bar 1 carries an angle-bar 1ª to provide a bearing for the outer end of the bolt 3, as will be readily understood.

In actual use this machine is pushed across the field by the operator with the plows or shovels plowing at the required depth, this depth of cut being easy to maintain, owing to the fact that the heft of the machine is supported by the wheels, and the springs 11 or 11ª, as the case may be, tend to hold the plows down to their work.

In case the plow or plows strike an unusually hard spot in the ground it is obvious that the increased power which the operator at that instant applies on the handle unavoidably would, in case of a rigid connection between the plow and the handle, swing the latter forward and raise the plow out of the ground. Owing to the fact that this machine is provided with a yielding connection between the plow and the handle this unavoidably-increased power on the latter causes the same to swing forward, as described, but does not appreciably vary the position of the plow in the ground, because the springs under such increased power yield, as will be readily understood. The spring tends to throw the power applied to the handle on the axle instead of on the plow, as would be the case without the flexible connection between the handle and the plow, and therefore makes the machine run easier and steadier and regulates largely the depth of the furrow.

By the provision of duplicate sets of cultivating appliances of the same or different types it is obvious that I combine in one machine devices which hitherto have been found in two, and have therefore produced a machine which can be employed for different purposes and which is conveniently portable by simply raising the handle sufficiently high to lift the cultivating-shovels clear of the ground.

From the above description it will be apparent that I have produced a hand-cultivator which possesses the features of advantage enumerated in the statement of invention, and it is to be understood that I reserve the right to make all changes which properly fall within the spirit and scope of my invention.

Having thus described the invention, what I claim as new, and desire to secure by Letters Patent, is—

1. A cultivator, comprising a carrying-wheel, a handle-bar mounted at its front end upon the axle of said wheel, an arm or bracket pivoted upon the axle of said wheel and diverging rearward with respect to the handle-bar, and a yielding connection between the handle-bar and said arm or bracket, substantially as described.

2. A cultivator, comprising a wheeled frame, brackets mounted upon the axle thereof, an expansive frame connecting said brackets, cultivating appliances upon said brackets, and yielding connections between said appliances and the frame, substantially as described.

3. A cultivator, comprising a wheeled frame, brackets mounted upon the axle thereof, an expansive frame connecting said brackets, consisting of a pair of intersecting bars having intermeshing teeth, a bolt extending through said bars at their point of intersection, and a clamping-nut engaging said bolt, cultivating appliances upon said brackets, and yielding connections between said appliances and the frame, substantially as described.

4. A cultivator, comprising a pair of handle-bars, having a handle at one end, carrying-wheels supporting the opposite end of said handle-bars, angle-brackets mounted on the axles of said wheels, retractile springs connecting said handle-bars with the upper and lower ends of said brackets, and cultivating appliances carried by said brackets, substantially as described.

5. A cultivator, comprising handle-bars, a handle, bolts projecting from said handle-bars, wear-spindles upon said bolts, washers at opposite ends of said spindles, wheels journaled upon said spindles and held between said washers, and clamping-nuts engaging the threaded ends of said bolts, in combination with brackets pivoted upon said bolts, cultivating appliances carried by said brackets, and yielding connections between said brackets and the handle-bars, substantially as described.

In testimony whereof I affix my signature in the presence of two witnesses.

CECIL M. DURNELL.

Witnesses:
M. R. REMLEY,
F. G. FISCHER.